United States Patent
Ham

(10) Patent No.: US 6,411,423 B2
(45) Date of Patent: Jun. 25, 2002

(54) TRANSMISSIVE DISPLAY DEVICE USING MICRO LIGHT MODULATOR

(75) Inventor: Yong Sung Ham, Kyounggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/730,846

(22) Filed: Dec. 7, 2000

(30) Foreign Application Priority Data

Dec. 10, 1999 (KR) .......................................... 99-56363

(51) Int. Cl.$^7$ ................................................ G02B 26/00
(52) U.S. Cl. ...................... 359/290; 359/254; 359/233
(58) Field of Search ................................. 359/290, 291, 359/295, 254, 233, 298, 454, 496; 353/88, 97, 75, 38, 87; 349/62, 66

(56) References Cited

U.S. PATENT DOCUMENTS 5,768,014 A * 6/1998 Lee .............................. 359/457
6,288,824 B1 * 9/2001 Kastalsky ..................... 359/254

* cited by examiner

Primary Examiner—Hung Xuan Dang
Assistant Examiner—Tuyen Tra
(74) Attorney, Agent, or Firm—Birch, Stewart, Kolasch & Birch, LLP

(57) ABSTRACT

A transmissive display device using a micro light modulator that is capable of improving a light efficiency. In the display device, a plurality of stationary members are provided on the first surface of the first transparent substrate in a line with and at a desired distance from each other in a stripe shape. A plurality of movable members are provided on the first transparent substrate and takes a bridge shape to be spaced from the stationary members and have each side overlapped with the stationary members. A light path controller is formed at each portion corresponding to the movable members on the second transparent substrate in such a manner to be spaced from the adjacent members, to reflect a light passing through a light path between each station member and each movable member such that the light is progressed perpendicularly to the second transparent substrate.

19 Claims, 2 Drawing Sheets

TRANSMISSIVE DISPLAY DEVICE USING MICRO LIGHT MODULATOR

BACKGROUND OF THE INVENTION

1. Field of the Invention

This invention relates to a display device for modulating a light beam to display a picture, and more particularly to a transmissive display device using a micro light modulator to which a micro electromechanical system as an ultra fine processing technique is applied.

2. Description of the Related Art

Nowadays, there has been actively made a study of various flat panel display devices expected to be next generation display devices. Such flat panel display devices include a liquid crystal display (LCD) and a plasma display panel (PDP), etc. available in the market. The LCD has disadvantages in that it has a narrow view angle and a slow response speed and that its fabrication process is complicated because thin film transistors (TFT's) as switching devices and electrodes, etc. are formed by a semiconductor fabrication process. On the other hand, the PDP has an advantage in that its fabrication process is simple to provide a large-dimension screen. However, the PDP has a disadvantage in that it has low discharge and luminescence efficiencies.

Accordingly, there has been conducted a development of a novel display device capable of overcoming such problems in the flat panel devices. Recently, there has been suggested a transmissive display device that forms a micro light modulator for each pixel using a micro electro-mechanical system (MEMS) as an ultra-fine processing technique so as to display a picture.

FIG. 1 is a schematic section view showing a structure of a conventional transmissive display device using a micro light modulator. Referring to FIG. 1, the conventional transmissive display device includes a plurality of stationary members 13 provided on a transparent substrate 11 in a line with and at a desired distance from each other in a stripe shape, a plurality of movable members 15 taking a bridge shape to be space from the stationary members 13 and have each side overlapped with the stationary members 13, and a light path controller 16 in which reverse-triangular structures are extended on a second transparent substrate 17 in the same direction as the stationary members 13 and the movable members 15.

The stationary members 13 are formed from a multi-layer thin film consisting of a conductive material for an electrode and an insulating material for an insulating layer, and the upper surface of each stationary member 13 has to be insulated.

The movable members 15 with a bridge shape has each end secured to the transparent substrate 11 and has a center portion floated, by a desired distance, from the transparent substrate 13 to be spaced from the stationary members 13. The movable members 15 are formed from a good elastic material and a multi-layer thin film consisting of a conductive material for an electrode and an insulating material for an insulating layer, etc, and the surfaces of the movable members 15 opposed to the stationary members 13 have to be insulated. The stationary members 13 and the movable members 15 have opaque surfaces.

The stationary members 13 and the movable members 15 are connected or disconnected to each other by a static electricity force exerting mutually in accordance with a voltage difference caused by an electrical signal applied to each electrode of the stationary members 13 and the movable members 15, thereby opening or closing a light path. More specifically, if a voltage difference is generated between each stationary member 13 and each movable member 15, then the movable members 15 are subject to a stress to be moved toward the stationary members 13 and thus come into contact with the stationary members 13 with certain overlapping portions. Otherwise, if a voltage difference is not generated, then a stress applied to the movable members 15 is released into the primary position to thereby be spaced from the stationary members 13. Accordingly, if the movable members 15 come into contact with the stationary members 13 with overlapping portions to close a light path, then an incident light from a light source (not shown) installed at the rear side of the first transparent substrate 11 is shut off without a transmission. Otherwise, if the movable members 15 are spaced from the stationary members 13 to form a light path, then the incident light is transmitted.

The light path controller 16 has reverse-triangular structures formed continuously on the second transparent substrate 17. The light path controller 16 is made by a fine machining of a polymer, and has a refractive index of about 1.58 to 1.64 and a vertical angle of about 45 to 80°. Thus, the light path controller 16 changes a light path such that a light inputted from the light source at an incidence angle of about 60 to 80° and passing through a light path between each stationary member 13 and each movable member 15 is progressed perpendicularly to the first transparent substrate 11, that is, toward an observer.

However, the conventional transmissive display device using a micro light modulator has a problem in that, since the light path controller includes unnecessary parts to be continuously formed on the second transparent substrate, its formation process is difficult and its processing time is increased.

SUMMARY OF THE INVENTION

Accordingly, it is an object of the present invention to provide a transmissive display device using a micro light modulator that includes a light path controller implemented by an easy fine machining process and a reduced processing time.

In order to achieve these and other objects of the invention, a transmissive display device using a micro light modulator according to the present invention includes first and second transparent substrates; a plurality of stationary members provided on the first surface of the first transparent substrate in a line with and at a desired distance from each other in a stripe shape; a plurality of movable members formed on the first transparent substrate with taking a bridge shape to be spaced from the stationary members and have each side overlapped with the stationary members; and a light path controller, being formed at each portion corresponding to the movable members on the second transparent substrate in such a manner to be spaced from the adjacent members, for reflecting a light passing through a light path between each station member and each movable member such that the light is progressed perpendicularly to the second transparent substrate.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
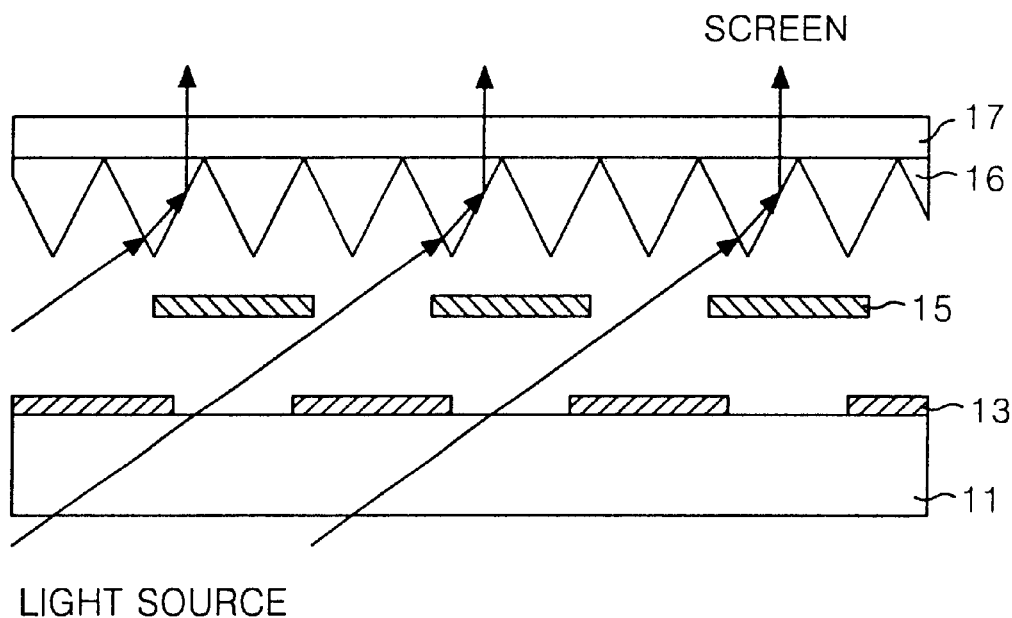
FIG. 1 is a schematic section view showing a structure of a conventional transmissive display device using a micro light modulator.
Figure 2:
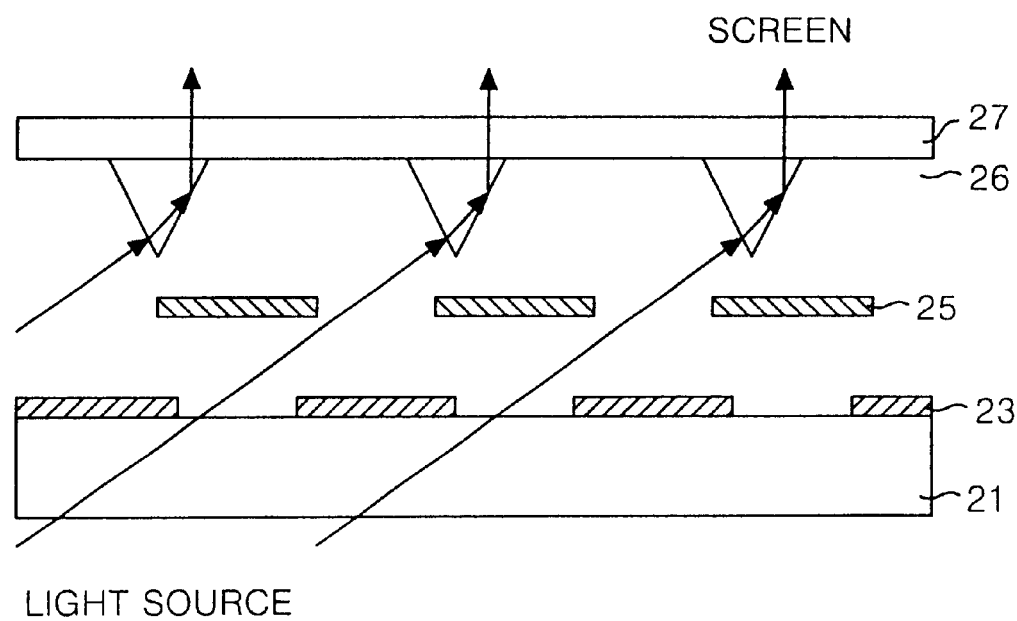
FIG. 2 is a schematic section view showing a structure of a transmissive display device using a micro light modulator according to a first embodiment of the present invention.

Referring to FIG. 2 there is shown a transmissive display device using a micro light modulator according to a first embodiment of the present invention. The transmissive display device includes a plurality of stationary members 23 provided on a first transparent substrate 21 in a line with and at a desired distance from each other in a stripe shape, a plurality of movable members 25 taking a bridge shape to be space from the stationary members 23 and have each side overlapped with the stationary members 23, and a light path controller 26 having reverse-triangular structures formed continuously at each portion corresponding to the movable members 25 on the second transparent substrate 27 in such a manner to be spaced from the adjacent structure.

The stationary members 23 are formed from a multi-layer thin film consisting of a conductive material for an electrode and an insulating material for an insulating layer, and the upper surface of each stationary member 13 has to be insulated.

The movable members 25 with a bridge shape has each end secured to the transparent substrate 21 and has a center portion floated, by a desired distance, from the stationary members 23 to be spaced from the stationary members 23. The movable members 25 are formed from a good elastic material and a multi-layer thin film consisting of a conductive material for an electrode and an insulating material for an insulating layer, etc, and the surfaces of the movable members 25 opposed to the stationary members 23 have to be insulated. The stationary members 23 and the movable members 25 have opaque surfaces.

The stationary members 23 and the movable members 25 are connected or disconnected to each other by a static electricity force exerting mutually in accordance with a voltage difference caused by an electrical signal applied to each electrode of the stationary members 23 and the movable members 25, thereby opening or closing a light path. More specifically, if a voltage difference is generated between each stationary member 23 and each movable member 25, then the movable members 25 are subject to a stress to be moved toward the stationary members 23 and thus come into contact with the stationary members 23 with certain overlapping portions. Otherwise, if a voltage difference is not generated, then a stress applied to the movable members 25 is released into the primary position to thereby be spaced from the stationary members 23. Accordingly, if the movable members 15 come into contact with the stationary members 23 with overlapping portions to close a light path, then an incident light from a light source (not shown) installed at the rear side of the first transparent substrate 11 is shut off without a transmission. Otherwise, if the movable members 25 are spaced from the stationary members 23 to form a light path, then the incident light is transmitted.

The light path controller 26 has reverse-triangular structures formed continuously at each portion corresponding to the movable members 25 on the second transparent substrate 27 in such a manner to be spaced from the adjacent structures. The light path controller 26 is made by a fine machining of a polymer, and has a refractive index of about 1.58 to 1.64 and a vertical angle of about 45 to 80°.

In this case, the light path controller 26 may be made by depositing a polymer having a refractive index of about 1.58 to 1.64 on the second transparent substrate 27 and thereafter pattering it into a reverse-triangular shape, or by adhering a transparent tape attached with a polymer patterned into a reverse-triangular shape to the second transparent substrate 27.

The light path controller 26 changes a light path such that a light inputted from the light source at an incidence angle of about 60 to 80° and passing through a light path between each stationary member 23 and each movable member 25 is progressed perpendicularly to the second transparent substrate 27, that is, toward an observer. In this case, the light path controller 26 is not formed on the entire surface of the second transparent substrate 27, but is formed at each portion corresponding to the movable members 25 in such a manner to be spaced by a certain distance. However, the light path controller 26 reflects a light passing through each light path of the stationary members 23 and the movable members 25 such that the light is progressed perpendicularly to the second transparent substrate 27. As described above, the light path controller 26 is formed at each portion corresponding to the movable members 25 rather than on the entire surface of the second transparent substrate 27 in such a manner to be spaced by a certain distance, so that it formation by a fine mechanical machining becomes easy an its processing time is reduced.

Figure 3:
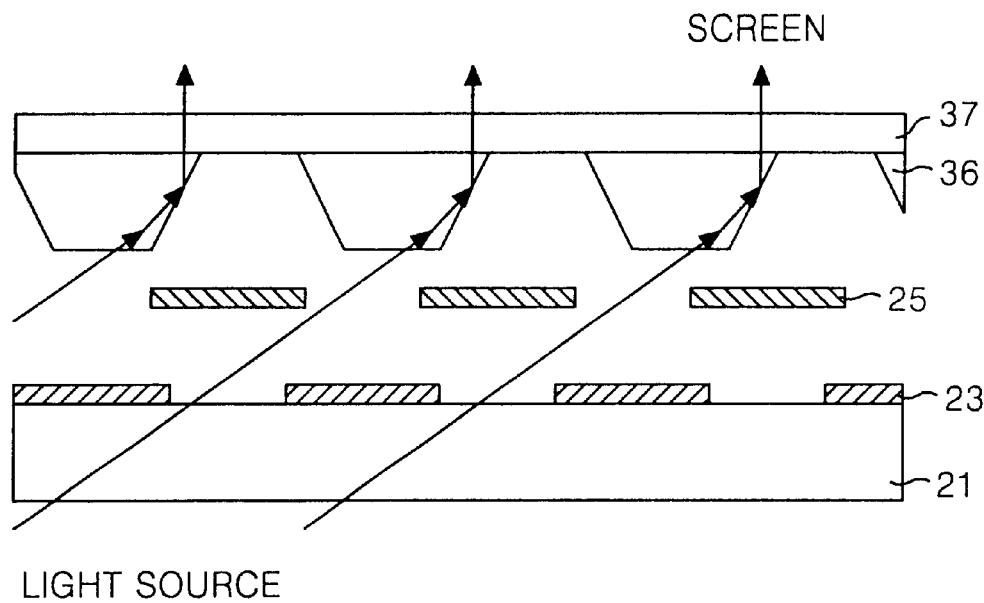
FIG. 3 is a schematic section view showing a structure of a transmissive display device using a micro light modulator according to a second embodiment of the present invention.

Referring to FIG. 3 there is shown a transmissive display device using a micro light modulator according to a second embodiment of the present invention. In similarity to the transmissive display device according to the first embodiment, the transmissive display device according to the second embodiment includes a plurality of stationary members 23 provided on a first transparent substrate 21 in a line with and at a desired distance from each other in a stripe shape, and a plurality of movable members 25 taking a bridge shape to be space from the stationary members 23 and have each side overlapped with the stationary members 23.

In the second embodiment, however, a light path controller 36 has reverse-rhombic structures formed continuously at each portion corresponding to the movable members 25 on a second transparent substrate 37, unlike the reverse-triangular structures shown in FIG. 2, in such a manner to be spaced from the adjacent structures. The light path controller 36 is formed from a fine-machined polymer and has a refractive index of about 1.58 to 1.64. The side surface of the light path controller 36 has an angle of about 23 to 40° with respect to a normal surface of the second transparent substrate 37.

In this case, the light path controller 36 is made by depositing a polymer having a refractive index of about 1.58 to 1.64 on the second transparent substrate 37 and thereafter pattering it into a reverse-rhombus shape, or by adhering a transparent tape attached with a polymer patterned into a reverse-rhombus shape to the second transparent substrate 37. Alternatively, the light path controller 36 may be made by patterning the second transparent substrate 37 into a reverse-rhombus shape. Also, the light path controller 36 is made by spray injecting, that is, coating said polymer on the second transparent substrate 37.

The light path controller 36 changes a light path such that a light inputted from the light source at an incidence angle of about 60 to 80° and passing through a light path between each stationary member 23 and each movable member 25 is progressed perpendicularly to the second transparent substrate 37, that is, toward an observer. In this case, the light path controller 36 is formed at each portion corresponding to the movable members 25 rather than on the entire surface of the second transparent substrate 37 in such a manner to be spaced by a certain distance, so that its formation process by a fine mechanical machining becomes easy and its processing time is reduced.

Figure 4:
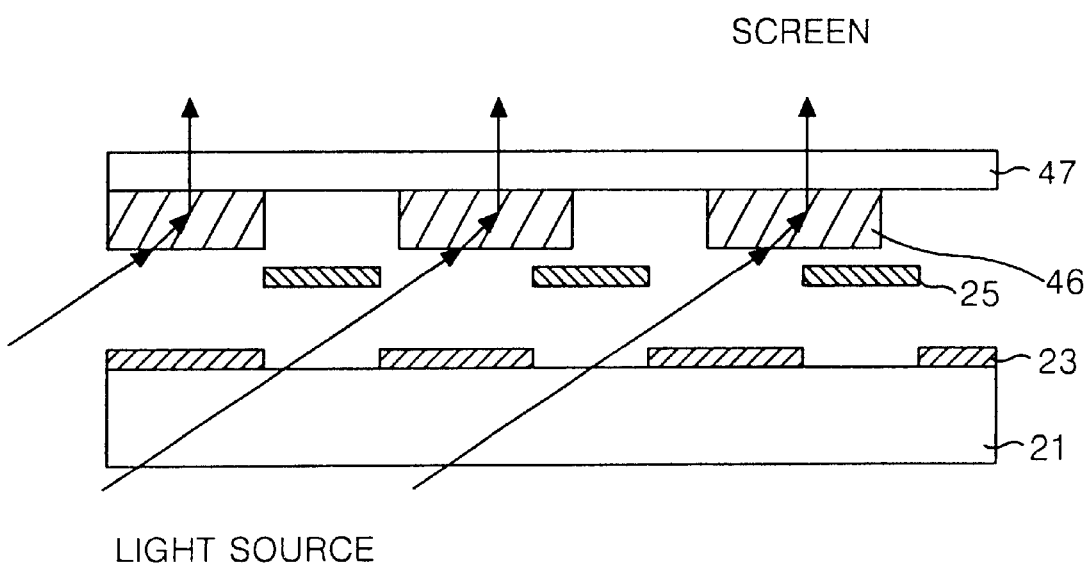
FIG. 4 is a schematic section view showing a structure of a transmissive display device using a micro light modulator according to a third embodiment of the present invention.

Referring to FIG. 4 there is shown a transmissive display device using a micro light modulator according to a third embodiment of the present invention. In similarity to the transmissive display device according to the first embodiment, the transmissive display device according to the third embodiment includes a plurality of stationary members 23 provided on a first transparent substrate 21 in a line with and at a desired distance from each other in a stripe shape, and a plurality of movable members 25 taking a bridge shape to be space from the stationary members 23 and have each side overlapped with the stationary members 23.

In the third embodiment, however, a light path controller 46 has rectangular structures formed continuously at each portion corresponding to the movable members 25 on a second transparent substrate 47 in such a manner to be spaced from the adjacent structures. The light path controller 46 is formed from a fine-machined holographic film.

The light path controller 46 has a periodic refractive index to change a path of a light passing through a light path between each stationary member 23 and the movable member 25 by a diffraction such that the light is progressed perpendicularly to the second transparent substrate 47, that is, toward an observer.

As described above, according to the present invention, the light path controller is formed at each portion corresponding to the movable members rather than on the entire surface of the second transparent substrate in such a manner to be spaced by a certain distance. Accordingly, the light path controller has an advantage in that its fine machining process becomes easy and its processing time is reduced.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A transmissive display device using a micro light modulator, comprising:
   first and second transparent substrates;
   a plurality of stationary members provided on the first surface of the first transparent substrate in a line with and at a desired distance from each other in a stripe shape;
   a plurality of movable members formed on the first transparent substrate with taking a bridge shape to be spaced from the stationary members and have each side overlapped with the stationary members; and
   a light path controller having a plurality of light control members being formed at each portion corresponding to the movable members on the second transparent substrate in such a manner that each light control member is spaced from an adjacent light control member, for reflecting a light passing through a light path between each stationary member and each movable member such that the light is progressed perpendicularly to the second transparent substrate.

2. The transmissive display device according to claim 1, wherein each of said stationary members is formed from a multi-layer thin film including a conductive material layer and an insulating material layer, and each upper surface of the stationary members is insulated.

3. The transmissive display device according to claim 1, wherein each of said movable members is formed from an elastic material and a multi-layer thin film including a conductive material layer and an insulating material layer, and a surface of the movable members opposed to the stationary members is insulated.

4. The transmissive display device according to claim 1, wherein each of the stationary members and the movable members has an opaque surface.

5. The transmissive display device according to claim 1, wherein the light path controller has reverse-triangular structures formed continuously.

6. The transmissive display device according to claim 5, wherein the light path controller is made by depositing a polymer on the second transparent substrate and patterning it into a reverse-triangle shape, or by adhering a transparent tape attached with a polymer patterned into a reverse-triangle shape to the second transparent substrate, or by spray-injecting a polymer to coat it on the second transparent substrate.

7. The transmissive display device according to claim 5, wherein the light path controller is made by patterning the second transparent substrate into a reverse-triangle shape.

8. The transmissive display device according to claim 5, wherein the light path controller has a vertical angle of 45 to 85°.

9. The transmissive display device according to claim 1, wherein the light path controller has reverse-rhombic structures continuously formed.

10. The transmissive display device according to claim 9, wherein the light path controller is made by depositing a polymer on the second transparent substrate and thereafter patterning it into a reverse-rhombus shape, or by adhering a transparent tape attached with a polymer patterned into a reverse-rhombus shape to the second transparent substrate, or by spray-injecting a polymer to coat it on the second transparent substrate.

11. The transmissive display device according to claim 9, wherein the light path controller is made by patterning the second transparent substrate into a reverse-rhombus shape.

12. The transmissive display device according to claim 9, wherein the side surface of the light path controller has an angle of 23 to 40° with respect to the normal surface of the second transparent substrate.

13. The transmissive display device according to claim 1, wherein the light path controller is formed from a fine machined holographic film.

14. A transmissive display device using a micro light modulator comprising:
    first and second substrates;
    a plurality of stationary members on a first surface of the first substrate;
    a plurality of movable members spaced apart from the plurality of stationary members and in between the first and second substrates;
    at least two light path controllers on a side of the second substrate facing the first substrate in a position corresponding to the movable members and with a space on the second substrate positioned between each controller, the controllers allowing incident light to be transmitted through the second substrate at a point where the controller is positioned on the substrate.

15. The device of claim 14, wherein the controllers are transparent.

16. The device of claim 14, wherein the controllers direct light incident on the controller perpendicularly through the second substrate.

17. The device of claim 14, wherein each controller is triangular.

18. The device of claim 14, wherein each controller has a reverse-rhombus shape.

19. The device of claim 14, wherein each controller is formed of a fine machined holographic film.

* * * * *